US012350736B2

(12) United States Patent
Hauberg et al.

(10) Patent No.: US 12,350,736 B2
(45) Date of Patent: Jul. 8, 2025

(54) PART TREE SUPPORT SYSTEM (71) Applicant: Mueller International, LLC, Atlanta, GA (US)

(72) Inventors: Clayton R. Hauberg, Springfield, IL (US); Paul Warren Clements, Judsonia, AZ (US)

(73) Assignee: Mueller International, LLC, Atlanta, GA (US)

(*) Notice: Subject to any disclaimer, the term of this patent is extended or adjusted under 35 U.S.C. 154(b) by 34 days.

(21) Appl. No.: 17/876,384

(22) Filed: Jul. 28, 2022

(65) Prior Publication Data
US 2024/0033811 A1   Feb. 1, 2024

(51) Int. Cl.
*B23P 13/02* (2006.01)
*B22C 9/22* (2006.01)
*B22C 23/00* (2006.01)
*B25B 11/00* (2006.01)

(52) U.S. Cl.
CPC ............. *B22C 9/22* (2013.01); *B22C 23/00* (2013.01); *B23P 13/02* (2013.01); *B25B 11/00* (2013.01)

(58) Field of Classification Search
None
See application file for complete search history.

(56) References Cited

U.S. PATENT DOCUMENTS

| 299,142 | A | 5/1884 | Hilton | |
| 646,284 | A | 3/1900 | Hilton | |
| 2,670,766 | A | 3/1954 | Heinrich | |
| 3,097,559 | A * | 7/1963 | Chapman | F16B 21/165 411/348 |
| 3,633,637 | A | 1/1972 | Kolesh et al. | |
| 3,916,484 | A | 11/1975 | Kennedy | |
| 4,109,699 | A | 8/1978 | Miller et al. | |
| 5,215,297 | A * | 6/1993 | Sato | H01B 13/01209 269/296 |
| 5,305,992 | A * | 4/1994 | Kish | B23Q 1/035 269/274 |
| 5,490,664 | A * | 2/1996 | Justus | H01B 13/01209 269/903 |
| 5,761,981 | A | 6/1998 | Stoffels | |
| 5,788,225 | A * | 8/1998 | Iwata | B23Q 3/103 269/309 |

(Continued)

FOREIGN PATENT DOCUMENTS

WO   2003086685   10/2003
WO   2018195190   10/2018

OTHER PUBLICATIONS

Harbour, Theodore Chad; Applicant-Initiated Interview Summary for U.S. Appl. No. 15/956,452, filed Apr. 18, 2018, mailed Dec. 17, 2019, 3 pgs.

(Continued)

*Primary Examiner* — Edward F Landrum
*Assistant Examiner* — Dana Lee Poon
(74) *Attorney, Agent, or Firm* — Taylor Duma LLP (57) ABSTRACT

A part tree support apparatus can include a base defining an upper surface, the upper surface defining a plurality of openings; and a plurality of supports, each of the plurality of supports extending from the base and removably secured to the base with a fastener engaged with one of the plurality of openings, each of the plurality of supports defining a recess facing in a Z-axis direction.

24 Claims, 7 Drawing Sheets (56) References Cited

U.S. PATENT DOCUMENTS

| | | | |
|---|---|---|---|
| 6,638,137 B1 | 10/2003 | Dempsey | |
| 6,711,031 B1 * | 3/2004 | Jelinger | H02G 3/32 |
| | | | 174/72 A |
| 7,036,810 B2 * | 5/2006 | Wal, III | B23Q 3/183 |
| | | | 269/296 |
| 10,722,941 B2 | 7/2020 | Harbour et al. | |
| 11,192,177 B2 | 12/2021 | Harbour et al. | |
| 2003/0139841 A1 | 7/2003 | Decord, Jr. | |
| 2010/0140860 A1 * | 6/2010 | Gao | B62D 65/10 |
| | | | 269/311 |
| 2013/0106042 A1 * | 5/2013 | Gao | B62D 65/026 |
| | | | 269/289 R |
| 2018/0304350 A1 * | 10/2018 | Harbour | B23K 26/352 |
| 2019/0093314 A1 | 3/2019 | Nilsson et al. | |
| 2020/0306824 A1 | 10/2020 | Harbour et al. | |

OTHER PUBLICATIONS

Harbour, Theodore Chad; Corrected Notice of Allowance for U.S. Appl. No. 15/956,452, filed Apr. 18, 2018, mailed May 1, 2020, 3 pgs.

Harbour, Theodore Chad; Non-Final Office Action for U.S. Appl. No. 15/956,452, filed Apr. 18, 2018, mailed Oct. 2, 2019, 11 pgs.

Harbour, Theodore Chad; Notice of Allowance for U.S. Appl. No. 15/956,452, filed Apr. 18, 2018, mailed Mar. 23, 2020, 9 pgs.

Harbour, Theodore Chad; Requirement for Restriction/Election for U.S. Appl. No. 15/956,452, filed Apr. 18, 2018, mailed May 16, 2019, 5 pgs.

Harbour, Theodore Chad; Applicant-Initiated Interview Summary for U.S. Appl. No. 16/902,553, filed Jun. 16, 2020, mailed Sep. 3, 2021, 2 pgs.

Harbour, Theodore Chad; Notice of Allowance for U.S. Appl. No. 16/902,553, filed Jun. 16, 2020, mailed Oct. 28, 2021, 7 pgs.

Harbour, Theodore Chad; Non-Final Office Action for U.S. Appl. No. 16/902,553, filed Jun. 16, 2020, mailed Jul. 20, 2021, 11 pgs.

Harbour, Theodore Chad; International Preliminary Report on Patentability for PCT Application No. PCT/US2018/028155, filed Apr. 18, 2018, mailed Oct. 31, 2019, 9 pgs.

Harbour, Theodore Chad; International Search Report and Written Opinion for PCT Application No. PCT/US2018/028155, filed Apr. 18, 2018, mailed Aug. 22, 2018, 12 pgs.

Alufab Inc; Article entitled: "1.5"x.75" Single Slot T-Slotted Aluminum Framing Extrusion , located at <https://www.alufabinc.com/product/1-5-x-75-single-slot-t-slotted-aluminum-framing-extrusion/>, accessed on Jul. 20, 2022, 5 pgs.

Isel USA Inc; Article entitled: "Aluminum Extrusion T Slot Table Plates", located at <https://www.isel-us.com/aluminum-extrusion-t-slot-table-plates>, accessed on Jul. 20, 2022, 4 pgs.

Reichmann Casting Finishing; Article entitled: "Cutting-off Machine TS for Cutting off Risers", located at <https://www.casting-finishing.com/en/work-piece/pump-housings/t>, accessed on Jun. 28, 2022, 8 pgs.

* cited by examiner

PART TREE SUPPORT SYSTEM

TECHNICAL FIELD

Field of Use

This disclosure relates to fixtures for positioning and supporting fabricated parts while they are being processed. More specifically, this disclosure relates to fixtures for positioning cast parts while they are being separated from a part tree with automated equipment.

Related Art

Cast or molded parts, and in particular parts that are small enough, are often cast or molded together in sets for efficiency and other manufacturing considerations. One set can be a "tree" comprising multiple parts joined by a sprue and runners. After casting or molding, the sprue can resemble the trunk of the tree and the runners, which can connect each part to the sprue, can resemble branches of the tree. Depending on the properties of the material used to cast or mold the parts, the parts can sometimes be simply snapped or cut off or simple automated processes can be used to separate the parts before further processing as desired. If the material used to form the parts or the part's connection to the tree is sufficiently strong and/or thick, however, these previously contemplated processes can become more difficult, ineffective, inconsistent, inflexible, and/or expensive. In any case, the process of cutting the tree can be both tedious and messy and require multiple fixtures, each of which can take up valuable space in a facility and work with only one or a few trees.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a part tree support apparatus comprising: a base defining an upper surface, the upper surface defining a plurality of openings; and a plurality of supports, each of the plurality of supports extending from the base and removably secured to the base with a fastener engaged with one of the plurality of openings, each of the plurality of supports defining a recess facing in a Z-axis direction.

In a further aspect, disclosed is a system comprising: a part tree support apparatus comprising: a base defining an upper surface, the upper surface defining a plurality of openings; a plurality of supports, each of the plurality of supports extending from the base and removably secured to the base with a fastener engaged with one of the plurality of openings, each of the plurality of supports defining a recess facing in a Z-axis direction; and a part tree received within the apparatus, the part tree comprising a plurality of pins, each of the plurality of pins formed monolithically with the part tree and configured to be received within a corresponding recess of the support apparatus, a position of the part tree fixed with respect to the apparatus.

In yet another aspect, disclosed is a method of using a part tree support apparatus, the method comprising: preparing the part tree support apparatus by removably securing each of a plurality of supports to a base, the apparatus comprising each of the plurality of supports and the base; and positioning a part tree on the apparatus, each of a plurality of pins formed in the part tree being supported in a corresponding recess defined in a support of the plurality of supports.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the disclosed system or any portion of nearest to a user of same; "rear" is that end of the tooling or system that is opposite or distal the front; "left" is that which is to the left of or facing left from the user and facing towards the front; and "right" is that which is to the right of or facing right from the user and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a part tree support system for and associated methods, systems, devices, and various apparatuses are disclosed herein. In one aspect, the part tree support system can comprise a part tree support apparatus, which can comprise a base and a plurality of supports secured to the base.

Cast or molded parts can be made from one or more of a variety of materials and using one or more of a variety of processes. Regardless of the specific method or material used, as suggested above, such parts can be cast or molded together in sets for efficiency and other manufacturing considerations. One set of integrally cast or molded parts can resemble a monolithic "tree" comprising multiple parts joined by a sprue and runners. Depending on the properties of the material used to cast or mold the parts and the geometry of the tree, the parts can sometimes be simply snapped or cut off—not unlike the molded parts included in a model airplane kit—or simple automated processes can be used to separate the parts before further processing as desired. For example, in a mechanical tumbling operation each part of the set of integrally cast or molded parts can be made to experience stresses that will cause the individual parts to separate from each other. As noted above, when a stronger material is used the previously contemplated processes can become more difficult, ineffective, inconsistent, inflexible, and/or more expensive. More specifically, it can become impractical to use those processes at all because they cannot be guaranteed to separate the parts from one another without additional steps. In addition to the details disclosed above and below, U.S. application Ser. No. 15/956,452, filed Apr. 18, 2018, which issued into U.S. Pat. No. 10,722,941 on Jul. 28, 2020, discloses additional details and is hereby specifically incorporated by reference herein in its entirety.

Parts can be cast in one or more of a variety of materials including, for example and without limitation, metal, epoxy, concrete, plaster, or clay. Parts can be cast using one or more of a variety of processes including, for example and without limitation, investment casting, die casting, lost-wax casting, or sand casting. Parts can be molded in one or more of a variety of materials including, for example and without limitation, plastic, paper, cardboard, or even food. Parts can be molded using one or more of a variety of processes including, for example and without limitation, injection molding, extrusion molding, rotomolding, and thermoforming.

The terms "cast" and "mold" and the terms "casting" and "molding" can in a broad sense be used interchangeably, although over the course of time the terms "cast" and "casting" have generally become associated with parts fabricated in a mold from harder materials such as metal and the other harder materials listed above; and the terms "mold" and "molding" have generally become associated with parts fabricated in a mold from softer materials such as plastic and the other softer materials listed above. For the purposes of the current disclosure, a reference to "cast" or "casting" refers also to "mold" or "molding" and vice versa, unless otherwise specified.

Alloyed metals or "alloys" are commonly used in cast parts to produce parts having improved properties such as in the areas of strength, corrosion resistance, or fatigue resistance. Silicon-brass, just one example of a family of low-lead alloys with relatively high strength (the family including, for example and without limitation, the alloys designated as C87600, C87610, and C87850), can be advantageous to use for certain cast fittings but at the same time can require larger casting "gates" to facilitate the flow of material into a mold. Because of the larger gates and the greater material strength, conventional methods of automatically separating cast parts can become ineffective. Manually cutting 100% of the parts off each casted "tree," however, can be labor intensive and present other disadvantages such as those highlighted above. While an automated process of cutting each part from the tree using preprogrammed cutting patterns for each set of cast parts could be helpful, a large number of different patterns and various positioning jigs that the process typically involves can become obstacles.

Figure 1:
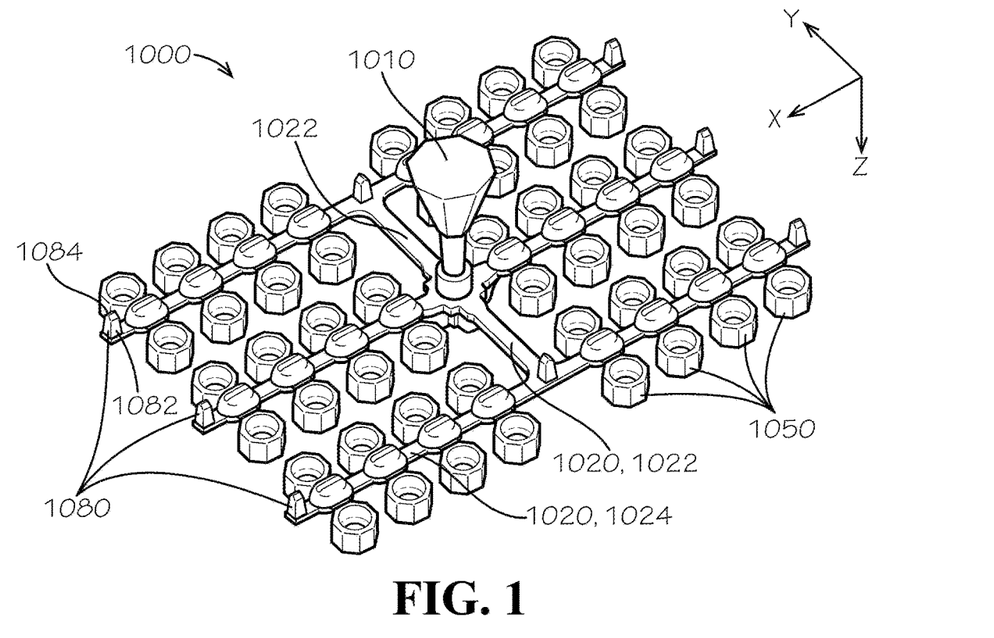
FIG. 1 is a bottom perspective view of a cast part tree in accordance with one aspect of the current disclosure.
Figure 2:
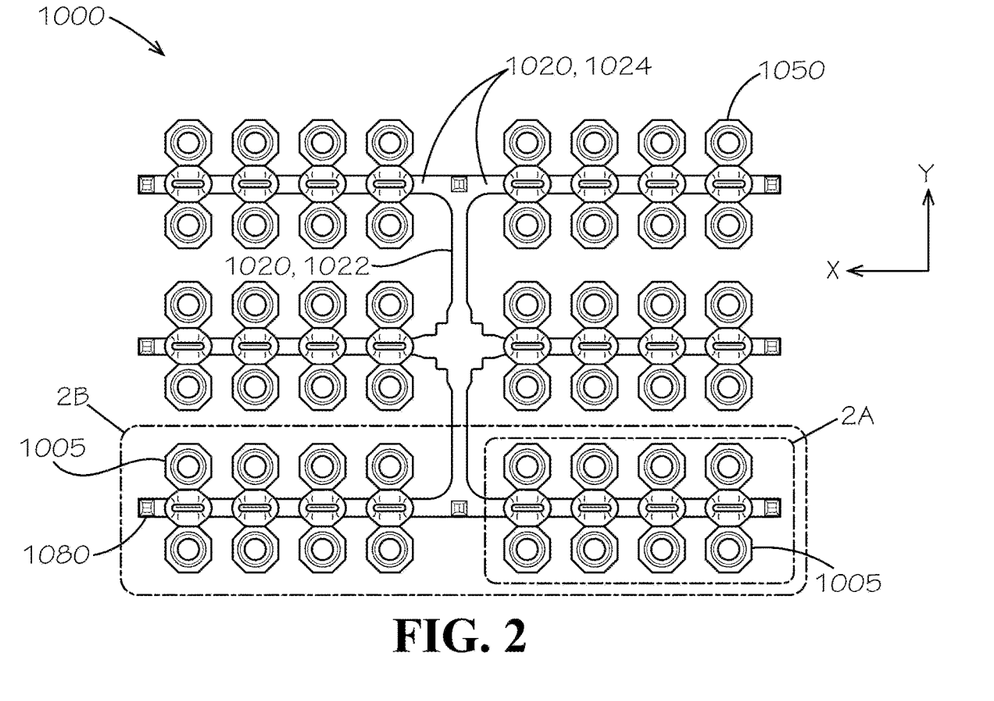
FIG. 2 is a bottom plan view of the cast part tree of FIG. 1.

FIG. 1 is a bottom perspective view of a part tree 1000, which can be a cast part tree, in accordance with one aspect of the current disclosure, and FIG. 2 is a bottom plan view of the part tree 1000 of FIG. 1 with a sprue 1010 thereof removed for clarity. Each of one or more parts 1050 can be cast or molded as part of the tree 1000, which can be formed from a material configured to harden inside a mold (not shown). The tree 1000 can be monolithic. The tree 1000 can comprise a sprue 1010, which can extend from or define a portion of the tree 1000 received within and proximate to an entrance of the mold into which liquid material forming the tree 1000 is poured or injected.

The tree 1000 can comprise a plurality of runners 1020. The plurality of runners 1020 can harden inside the mold and can extend from the sprue 1010 to a gate 1030 (shown in FIG. 4) connecting each of the parts 1050 to one of the plurality of runners 1020. The plurality of runners 1020 can comprise a main runner or primary runner 1022, which can extend from the sprue 1010, and a subrunner, branch runner, or secondary runner 1024, which can extend from the primary runner 1022. The sprue 1010, the runners 1020, and the gates 1030 can together define "gating" of the tree 1000. To help facilitate proper flow of the material into the mold, each gate 1030 can be made smaller in diameter than each connecting runner 1020, which can be made smaller in diameter than the sprue 1010. The sprue 1010, the runners 1020, the gates 1030, and the parts 1050 can be arranged to produce any one of a variety of tree geometries and part patterns. In one aspect, as shown, the parts 1050 can be substantially aligned in a single plane. In another aspect, the parts 1050 can be molded in different planes. The tree 1000 can be configured to be symmetrical about one or more planes of the tree 1000.

In some aspects, the primary runners 1022 can be angled with respect to an axis of the sprue 1010. More specifically, the primary runners 1022 can be angled at 90 degrees with respect to an axis of the sprue 1010. In some aspects, as shown in FIG. 2, the secondary runners 1024 can be angled with respect to at least one of the primary runners 1022 of the sprue 1010. More specifically, the secondary runners 1024 can be angled at 90 degrees with respect to the primary runners 1022. In some aspects, the one or more of the runners 1020 of the tree 1000 can extend in one of an X-axis direction and a Y-axis direction. As shown in detail 2A of FIG. 2, a branch 1005 of the tree 1000 can comprise one of the secondary runners 1024 and the parts 1050 extending from the corresponding runner 1024. As shown in detail 2B of FIG. 2, the branch 1005 of the tree 1000 can comprise one of the primary runners 1022 and the parts 1050 extending from the primary runner 1022 and any of the one or more secondary runners 1024 extending from the corresponding primary runner 1022.

The tree 1000 can comprise one or more support pins or pins 1080. As shown, for example and without limitation, the tree 1000 can comprise eight pins 1080. Each of the one or more pins 1080 can be formed monolithically with the part tree 1000. Each of the one or more pins 1080 can extend from one of the primary runners 1022 or the secondary runners 1024 of the sprue 1010. Each of the one or more pins 1080 can comprise a base 1082. Each of the one or more pins 1080 can comprise a tip 1084, which can extend from the base 1082 and be distal from the base 1082. Each of the one or more pins 1080 can extend in a Z-axis direction. Each of the one or more pins 1080 or an axis thereof can be angled with respect to at least one of the primary runners 1022 or the secondary runners 1024 of the sprue 1010. More specifically, each of the one or more pins 1080 or an axis thereof can be angled at 90 degrees with respect to at least one of the primary runners 1022 or the secondary runners 1024 of the sprue 1010.

Figure 3:
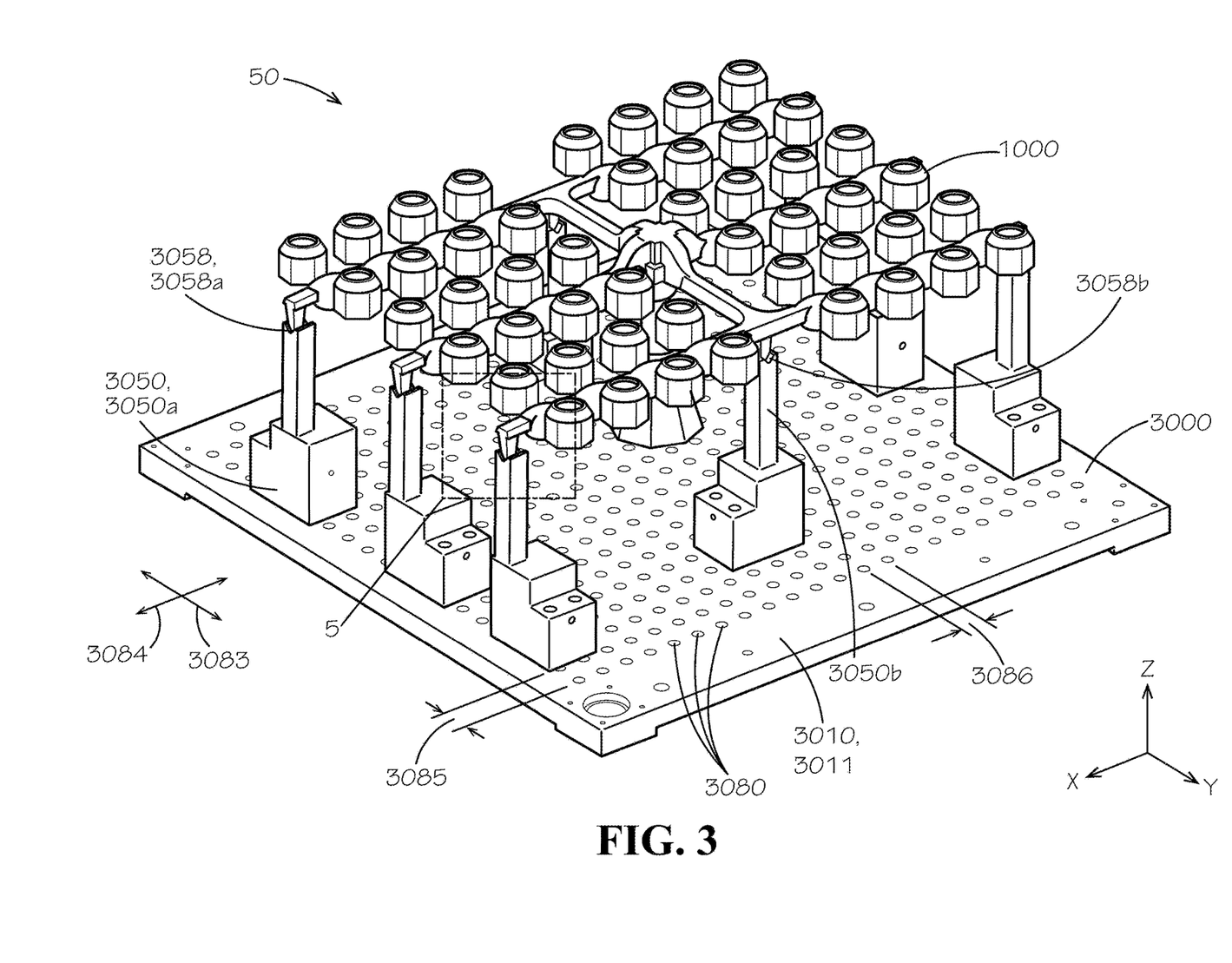
FIG. 3 is a top perspective view of a part tree support apparatus shown supporting the cast part tree of FIG. 1, the apparatus comprising a plate and a plurality of supports removably secured to the plate.

FIG. 3 is a top perspective view of a system 50 for separating the parts 1050 from the tree 1000 of FIG. 1, which can comprise a cutoff fixture or part tree support apparatus 3000 and the tree 1000. As shown, the part tree support apparatus 3000 can support the part tree 1000. More specifically, a position of the part tree 1000 can be fixed in three axes (e.g., along the X-axis, the Y-axis, and the Z-axis directions) with respect to the apparatus 3000 when the part tree 1000 is held in place in the apparatus 3000 with one of a gravitational force defined by a weight of the part tree 1000 and an upper support (not shown but described with respect to FIG. 4) of the system 50.

The part tree support apparatus 3000 can comprise a base 3010, which in some aspects can be or can comprise a plate as shown and can define an upper surface 3011. The part tree support apparatus 3000 can further define a lower surface 3012 (shown in FIG. 4). The base 3010 can extend in the X-axis and the Y-axis directions. The base 3010 can define a constant thickness. The upper surface 3011 can define a plurality of openings 3080, which can stop short of the lower surface 3012 (e.g., defining a bottom surface, as in a blind hole) or can also be defined in the lower surface 3012, such as a through hole. More specifically, the openings 3080 can be round holes or bores. At least in part, the openings 3080 can define threads configured to receive one or more fasteners 3090 (shown in FIG. 5).

The plurality of openings 3080 can define a grid pattern. More specifically, adjacent openings 3080 of the plurality of openings 3080 can be spaced apart by a first separation distance 3085 in a first direction 3083 and a second separation distance 3086 in a second direction 3084. Each of the first separation distance 3085 and the second separation distance 3086 can be constant between adjacent openings 3080 of the plurality of openings 3080. Each of the first separation distance 3085 and the second separation distance 3086 can be measured between centers of the adjacent openings 3080. The first direction 3083 can correspond to the Y-axis direction and the second direction 3084 can correspond to the X-axis direction. In some aspects, as shown, the first separation distance 3085 can equal the second separation distance 3086. In some aspects, as shown, the first direction 3083 can be orthogonal to the second direction 3084.

In some aspects, the openings 3080 can be elongated. More specifically, the openings 30180 can extend some or all the way across the base 3010. In some aspects, T-slot rails can be assembled to and form a portion of the base 3010 and the T-slot channels defined therein can be or can define the openings 3080. For example and without limitation, T-slot rails such as, for example and without limitation, single-slot T-slotted aluminum framing extrusions from AluFab, Inc. of Cincinnati, OH, U.S.A., can define the openings 3080, and such extrusions can be positioned on top of a surrounding portion of the base 3010 (e.g., a separate plate) or can be received within a groove or other recess defined in the surrounding portion of the base such that, for example and without limitation, each of the plurality of supports 3050 installs flush against the upper surface 3011 of the base 3010. In some aspects, the entire base 3010 can be a T-slot table or table plate such as, for example and without limitation, PT 25, PT 30, or PT 50 series aluminum extrusion figures or table plates available from Isel USA Inc. of Hicksville, New York, U.S.A. In some aspects, a T-slot fastener comprising a bolt and a nut configured for use with a T-slot can define the first portion 3092 and the second portion 3094. In some aspects, physical markings can be cut or printed or otherwise defined in the openings 3080 of the base 3010 to facilitate positioning of the plurality of supports 3050, especially where the openings 3080 allow finer position adjustments such as, for example and without limitation, at any point along a T-slot forming a particular opening 3080.

The part tree support apparatus 3000 can comprise a plurality of supports 3050. Each of the plurality of supports 3050 can extend from the base 3010. Each of the plurality of supports 3050 can be removably secured to the base 3010. More specifically, each of the plurality of supports 3050 can be removably secured to the base 3010 with the one or more fasteners 3090, each of which can be engaged with a corresponding opening 3080 of the plurality of openings 3080. Each of the supports 3050 can be movable to a different position on the base 3010 as desired to best support the part tree 1000. Just as the pins 1080 of the tree 1000 and, more generally, the geometry of the tree 1000 can be set to match preset positions on the grid defined by the openings 3080, positions of the supports 3050 can "snap" to preset positions on the grid during assembly or adjustment of the fixture. Labeling (e.g., of rows of the openings 3080 in one or both of the directions 3083,3084) can facilitate assembly of the apparatus 3000 and training therefor.

Each of the plurality of supports 3050 can define a recess 3058, which can face in the Z-axis direction. In some aspects, the recess 3058 can be any one or more of a notch, a depression, a cavity, or a hole and will include any surface or cavity recessed or offset from a surrounding or adjacent portion of the corresponding support 3050 or an equivalent structure. Each of the plurality of supports 3050 can extend from the base 3010 in the Z-axis direction. In some aspects, an orientation of at least one recess 3058, e.g., a recess 3058*b* defined by a support 3050*b*, of the plurality of recesses 3058 can be angled with respect to an orientation of at least one other recess 3058, e.g., a recess 3058*a* defined by a support 3050*a*, of the plurality of recesses 3058. In some aspects, more generally, an orientation of at least one support 3050, e.g., the support 3050*b*, can be angled with respect to an orientation of at least one other support 3050, e.g., the support 3050*a*. The orientation of the recess 3058— and any other structure such as, for example and without limitation, the support 3050—can be defined as a direction along which a cross-section of the geometry of the recess 3058 does not vary or varies the least (in the latter case, in comparison to other directions in which the cross-section of the geometry of the recess 3058 could be taken and viewed). In some aspects, an orientation of at least one support 3050 and the recess 3058 thereof can align with a direction along which either the runner 1022 or the runner 1024 extends.

Figure 4:
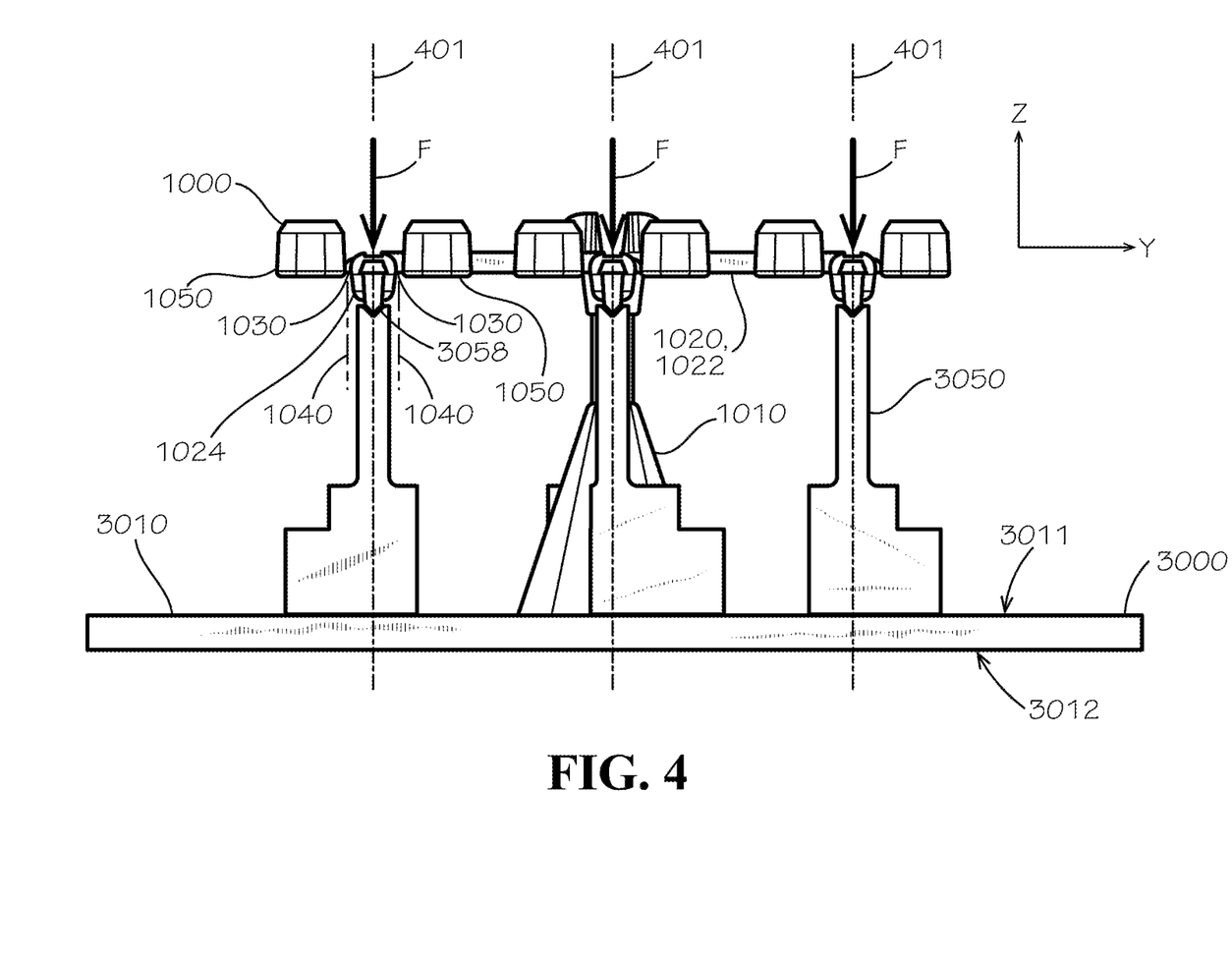
FIG. 4 is a side view of the part tree and the part tree support apparatus of FIG. 1.

FIG. 4 is a side view of the part tree 1000 and the part tree support apparatus 3000 of FIG. 1. As noted above, the part tree 1000 can be held in the apparatus 3000 with one of the gravitational force defined by the weight of the part tree 1000 and the aforementioned upper support of the system 50. While not explicitly shown, the upper support or any portion thereof can be any structure configured to hold the part tree 1000 in place inside the apparatus 3000 such as, for example and without limitation, a column or other member extending from a structure offset vertically from the part tree 1000 or an arm or other member extending from a structure offset horizontally from the part tree 1000 or any other clamping structure including a clamp comprising one or more jaws and configured to fix a position of some or all of the part tree 1000. More specifically, in some aspects, the upper support can contact and hold a position of the part tree 1000 along each of one or more positioning axes 401. In some aspects, the upper support can contact, hold, and push a position of the part tree 1000 along each of one or more positioning axes 401 with a force F. The positioning axes 401 can be located directly over and can be aligned with the supports 3050 and, more specifically, locators 6020 (shown in FIG. 6) and the recesses 3058 thereof.

The part tree 1000 and each gate 1030 thereof can be configured to be cut along a cutting reference 1040 in order to separate a corresponding part 1050 from a remaining portion of the part tree 1000. The cutting reference 1040 can be made to intersect the gate 1030 at a position at either of an intersection of the gate 1030 and the part 1050 and an intersection of the gate 1030 and the runner 1020 or between the intersection of the gate 1030 and the part 1050 and the intersection of the gate 1030 and the runner 1020. The cutting references 1040 associated with some or all of the parts 1050 can be made to align with each other (i.e., in a direction that is parallel or collinear with each other). In any case, a wide variety of configurations of the tree 1000 are contemplated herein.

Figure 5:
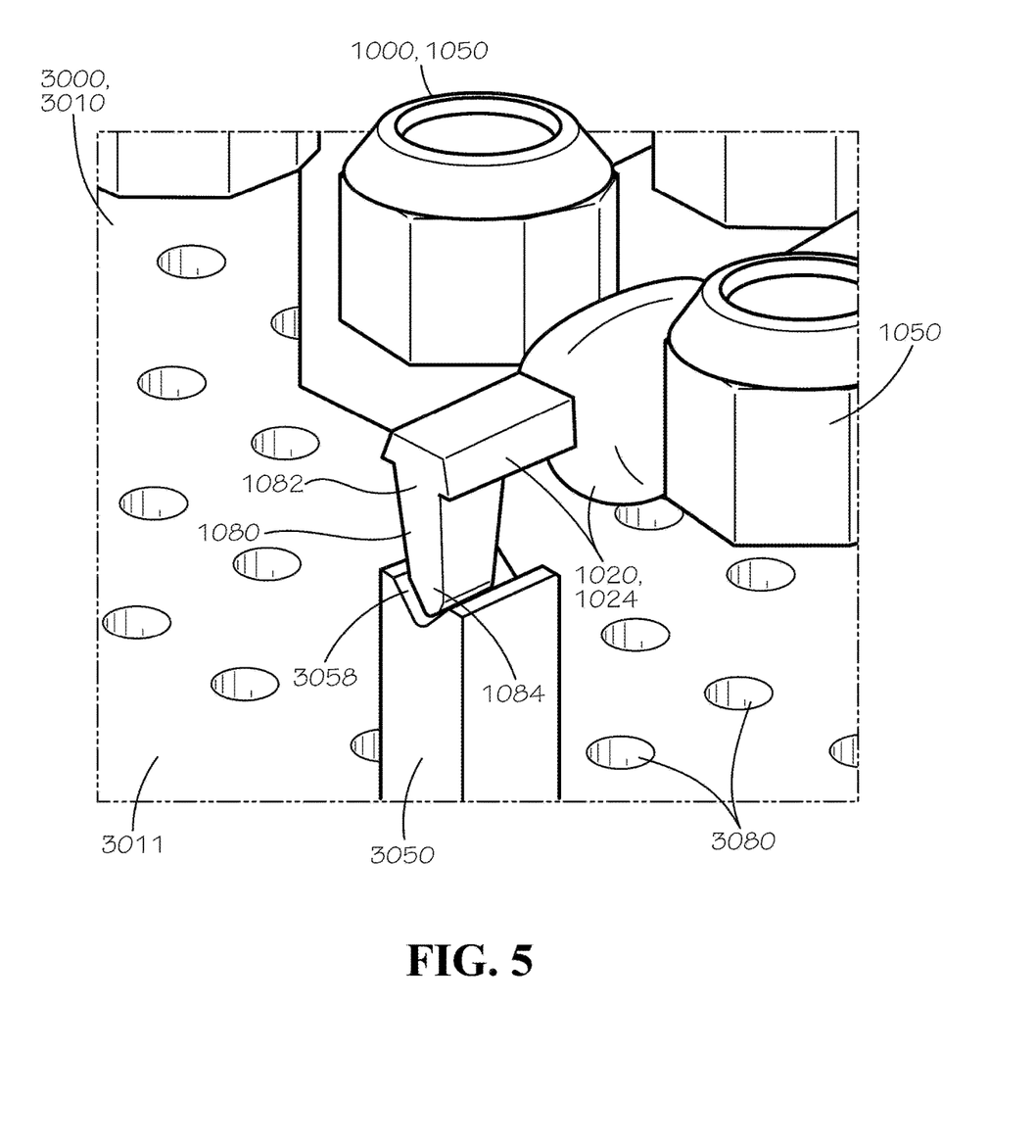
FIG. 5 is a detail perspective view of the part tree and the part tree support apparatus of FIG. 3 taken from detail 5 of FIG. 3.

FIG. 5 is detail perspective view of the part tree 1000 and the part tree support apparatus 3000 of FIG. 3 taken from detail 5 of FIG. 3. Each of the recesses 3058 can be configured to receive one of the plurality of pins 1080 of the part tree 1000, and similarly each of the plurality of pins 1080 can be configured to be received within a corresponding recess 3058 of the support apparatus 3000. For example and without limitation, as shown in FIG. 3, eight recesses 3058 of the apparatus 3000 can receive corresponding pins 1080 of the part tree 1000. Each of the pins 1080 and recesses 3058 can define a simple geometry for locating the part tree positively or definitely in the same place each time. For example and without limitation, each of the pins 1080 can defined a tapered shape or protrusion received within a tapered recess 3058. More specifically, one or both of a pin 1080 and a corresponding recess 3058 can be tapered in a direction of assembly of the two structures, e.g., in a Z-axis direction. More specifically, a width of the mating structures in the direction of assembly can be narrower at one end. For example and without limitation, a width of the tip 1084 in a transverse or horizontal direction of the pin 1080 can be narrower than a width of the base 1082 in the same direction. In some aspects, the pin 1080 can define another shape including, for example and without limitation, a conical or frustoconical shape, and each of the recesses 3058 can define a complementary recess in the corresponding support 3050. Because dust, dirt, grime, and other contaminants, whether liquid or solid, can build up in a foundry environment and thus the cleanliness of such an environment be difficult to maintain, the geometry of the pins 1080 and the recesses 3058 can be made to naturally shed contaminants and also made easy to clean and repair. For example, as shown, the pins 1080 and the recesses 3058 can define sloping surfaces. In some aspects, the recesses 3058 can define open recesses instead of closed holes in which contaminants (e.g., dirt and grime) can in some cases be more easily be trapped and/or build up over time.

Figure 6:
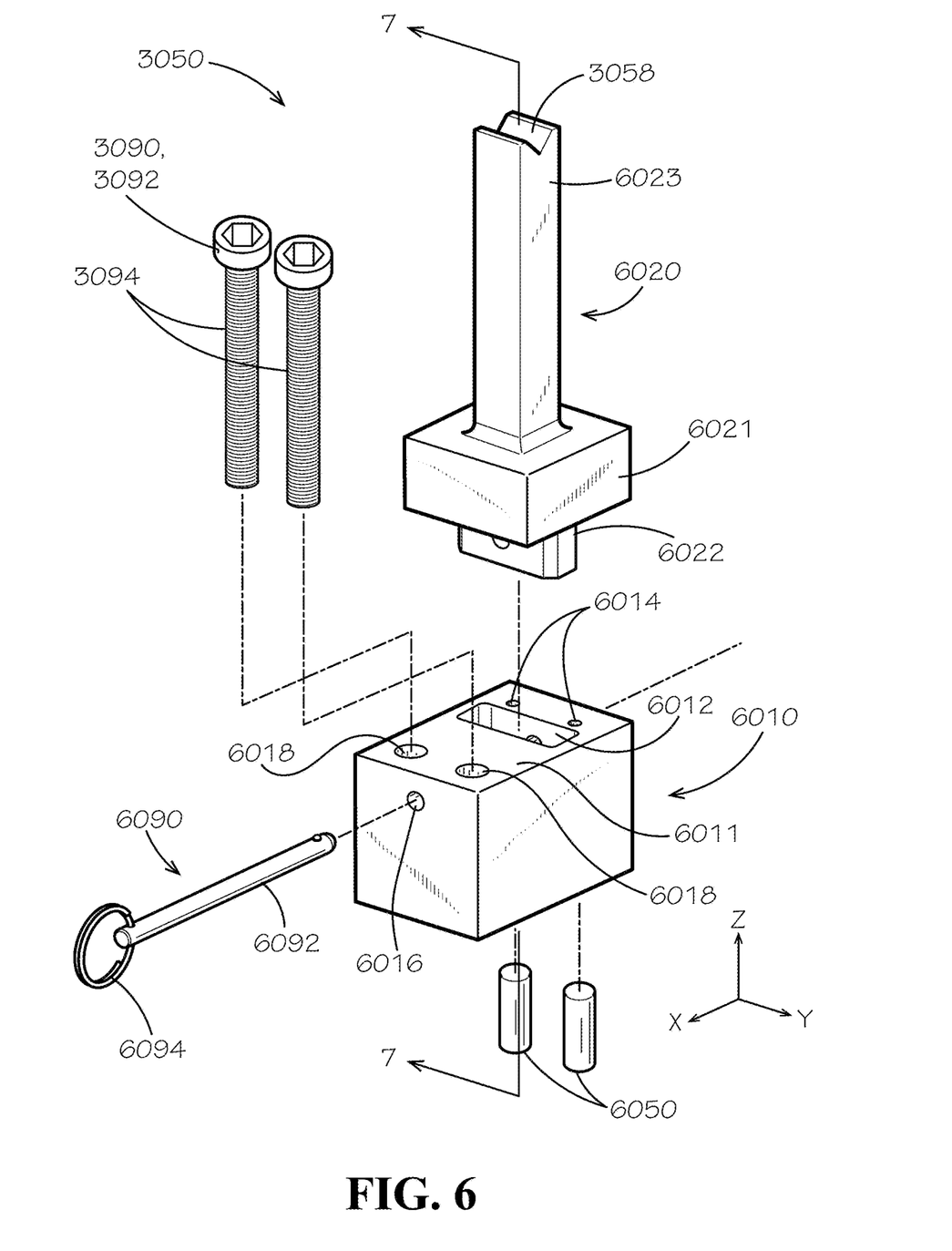
FIG. 6 is a top exploded perspective view of a support of the plurality of supports of FIG. 3.

FIG. 6 is a top exploded perspective view of the support 3050 of the plurality of supports 3050 of FIG. 3. Each of the plurality of supports 3050 can comprise an adapter 6010. Each of the plurality of supports 3050 can comprise a locator 6020, which can be secured to the adapter 6010. More specifically, the locator 6020 of each of the plurality of supports 3050 can be at least partly received within the corresponding adapter 6010 of the plurality of supports 3050. As shown, the locator 6020 can define the recess 3058. The locator 6020 of each of the plurality of supports 3050 can be removably secured to the corresponding adapter 6010 of the plurality of supports 3050 with a locator fastener 6090. In some aspects, as shown, the locator fastener 6090 can be a quick-release fastener not requiring a separate tool for engagement or disengagement or for tightening or loosening. In some aspects, the locator fastener 6090 can be a fastener requiring a separate tool for engagement or disengagement or for tightening or loosening. More specifically, the locator fastener 6090 can comprise a working portion 6092, which can comprise a pin. The locator fastener 6090 can comprise a head or handle 6094, which can facilitate insertion and removal of the locator fastener 6090. As shown, the handle 6094 can comprise a split ring. In some aspects, the handle 6094 can be formed integrally with the working portion 6092 as in the case of a T-handle or knobbed quick-release fastener, which can comprise a ball lock pin comprising a spring-loaded ball inside a pin.

The adapter 6010 can define a length or width in the X-axis direction, a length or width in the Y-axis direction, and a height in the Z-axis direction. In some aspects, as shown, the adapter 6010 can define a square or rectangular shape in cross-section. In some aspects, the adapter 6010 can define a non-square or non-rectangular shape in cross-section.

The adapter 6010 can define one or more locator cavities 6012, each of which can be sized, shaped, and otherwise configured to receive the corresponding locator 6020. A cross-section of the locator cavity 6012 can be constant in the Z-axis direction. In some aspects, as shown, the locator cavity 6012 can define a substantially rectangular shape in cross-section. In being "substantially rectangular," the shape can be rectangular except for radii and/or other features defined in the shape for purposes of machinability (e.g., with standard cutting tools) or durability (e.g., by removal of more vulnerable sharp corners on the locator 6020, which after being nicked may not fit properly in the locator cavity 6012) and, more generally, manufacturability or performance. In some aspects, the locator cavity 6012 can define a non-rectangular shape in cross-section.

The adapter 6010 can define one or more locator subcavities 6014. In some aspects, each of the locator subcavities can be sized, shaped, and otherwise configured to allow passage of air from one or more position fastener cavities 8018 (shown in FIG. 8) and through an upper surface 6011 of the adapter 6010 (to facilitate insertion of a position fastener 6050). In some aspects, the locator subcavities can be sized, shaped, and otherwise configured to receive another portion of the corresponding locator 6020 (e.g., one or more small pins, which are not shown, extending from the locator 6020 and configured to be received within the one or more locator subcavities 6014). A cross-section of the locator subcavity 6014 can be constant in the Z-axis direction. In some aspects, as shown, the locator subcavity 6014 can define a substantially circular shape in cross-section. In some aspects, the locator subcavity 6014 can define a non-circular shape in cross-section.

The adapter 6010 can define one or more locator fastener cavities 6016, each of which can be sized, shaped, and otherwise configured to receive the locator fastener 6090. The locator 6020 can additionally define a locator fastener cavity 7016, which can be aligned with the locator fastener cavities 6016 of the adapter 6010 in an assembled condition of the support 3050. A cross-section of one or both of the locator fastener cavities 6016,7016 can be constant in the X-axis direction or in another direction as desired. In some aspects, as shown, one or both of the locator fastener cavities 6016,7016 can define a substantially circular shape in cross-section. In some aspects, one or both of the locator fastener cavities 6016,7016 can define a non-circular shape in cross-section.

The adapter 6010 can define one or more support fastener cavities 6018, each of which can be sized, shaped, and otherwise configured to receive the fastener 3090. A cross-section of the support fastener cavity 6018 can be constant in the Z-axis direction or in another direction as desired. In some aspects, as shown, the support fastener cavity 6018 can define a substantially circular shape in cross-section. In some aspects, the support fastener cavity 6018 can define a non-circular shape in cross-section.

The locator 6020 can define a length or width in the X-axis direction, a length or width in the Y-axis direction, and a height in the Z-axis direction. In some aspects, as shown, the locator 6020 can define a first portion 6021, which can be supported by the adapter 6010. More specifically, the adapter 6010 can support a weight of the locator 6020 and any load placed thereupon, e.g., a portion of the part tree 1000. In some aspects, as shown, the locator 6020 can define a second portion 6022, which can extend in a Z-axis direction (and, more specifically, in a negative Z-axis direction, as can be said also of various other references to X-axis, Y-axis, or Z-axis directions disclosed herein, depending on the context) from the first portion 6021 and can be received within the adapter 6010. In some aspects, as shown, the locator 6020 can define a third portion 6023, which can extend in a positive Z-axis direction from the first portion 6021 and can define the recess 3058. In some aspects, as shown, the locator 6020 can define a square or rectangular shape in cross-section. In some aspects, the locator 6020 can define a non-square or non-rectangular shape in cross-section.

More specifically, the second portion 6022 can define shapes and features that are complementary to those of the locator cavity 6012 and can be shaped and otherwise configured to be received in the locator cavity 6012. In some aspects, as shown, the locator 6020 can be configured to be installed in either of two orientations in the locator cavity 6012, each of which can be angled at 180 degrees with respect to each other. In some aspects, the locator 6020 can be configured to be installed in fewer orientations (e.g., a single orientation) by defining a cross-sectional shape of the locator cavity 6012 and a mating portion, e.g., the second portion 6022, of the locator 6020 asymmetrical about at least one plane. In some aspects, the locator 6020 can be configured to be installed in more orientations (e.g., four orientations) by defining a cross-sectional shape that is symmetrical about two planes (e.g., with a square or substantially share shape). In some aspects, the locator 6020 can be configured to be installed in more than four orientations by defining a cross-sectional shape that is rotationally symmetrical or even circular.

In some aspects, the locator 6020 can be made separate from the adapter 6010 because the locator 6020 is more vulnerable to being damaged by a cutter of the cut-off machine, and replaceability of the locator 6020 can benefit a user of the system 50. More specifically, it can be easier to replace the locator 6020 than the entire support 3050. In some aspects, the support 3050 can define a single monolithic structure without separately formed structures such as the adapter 6010 and the locator 6020. The support 3050 can instead in the monolithic structure incorporate any one or more features of what in the other aspects can be the separate structures.

Each of the plurality of supports 3050 can be secured to the base 3010 (shown in FIG. 3) along at least a first axis with one or more of the attachment fasteners 3090. More specifically, each of the plurality of supports 3050 can be secured to the base 3010 (shown in FIG. 3) in at least a Z-axis direction with one or more of the attachment fasteners 3090. In some aspects, the one or more attachment fasteners 3090 can also secure each of the supports 3050 in one or both of a second axis and a third axis. More specifically, in some aspects, the one or more attachment fasteners 3090 can also secure each of the supports 3050 in one or both of the X-axis direction and the Y-axis direction. In some aspects, a position of each of the plurality of supports 3050 in one or both of the X-axis direction and the Y-axis direction can be fixed with one or more of the position fasteners 6050. In some aspects, as shown, each of the position fasteners 6050 can be a dowel or pin. More specifically, a top end of each of the position fasteners 6050 can be received within the support 3050, and a bottom end of each of the position fasteners 6050 can be received within one of the openings 3080. In some aspects, as shown, each of the attachment fasteners 3090 can comprise a threaded fastener. In some aspects, the attachment fasteners 3090 can comprise a non-threaded fastener, in which case the one or more fasteners 3090 can secure the corresponding support 3050 to the base 3010 with a non-threaded connection (e.g., a quick-release fastener, including as disclosed above). More specifically, each of the attachment fasteners 3090 can comprise a first portion or head 3092 and a second portion or tail 3094. The first portion 3092 can be configured to retain a position of the support 3050 in the Z-axis direction, and the second portion 3094 can be configured to engage the base 3010. In some aspects, the one or more fasteners 3090 can be configured to be remain secured to the base 3010 (e.g., as studs extending from the base 3010) and be received within the corresponding supports 3050, whether or not the fasteners 3090 are threaded.

Figure 7:
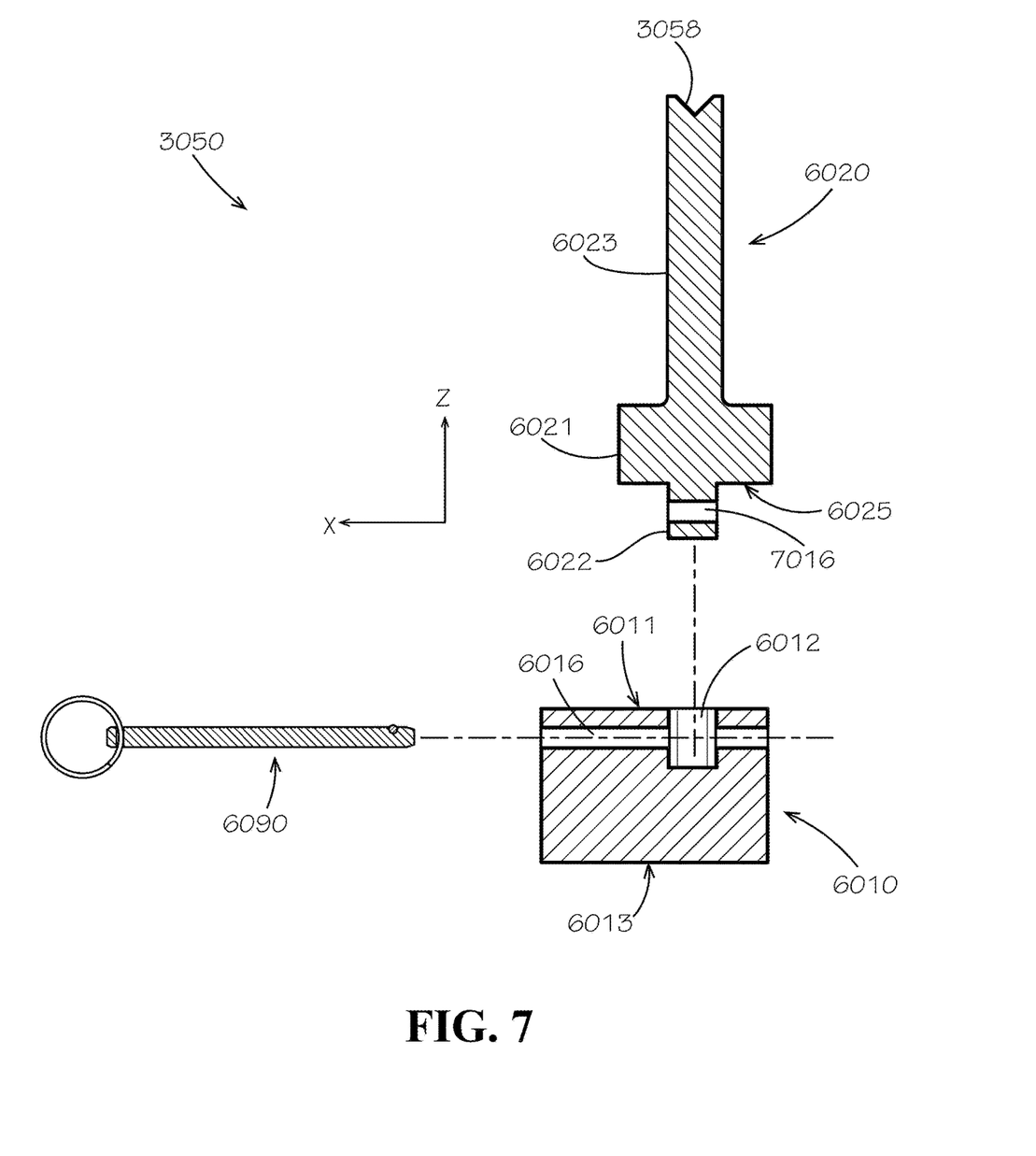
FIG. 7 is an exploded sectional view of the support of FIG. 6 taken along line 7-7 of FIG. 6.

FIG. 7 is an exploded sectional view of the support 3050 of FIG. 6 taken along line 7-7 of FIG. 6. In some aspects, as shown, the locator 6020 can be assembled to the adapter 6010 in the Z-axis direction. In some aspects, the locator 6020 can be assembled to the adapter 6010 in a direction angled with respect to the Z-axis direction. In some aspects, as shown, the locator fastener 6090 can be assembled to each of the adapter 6010 and the locator 6020 in the X-axis direction. In some aspects, the locator fastener 6090 can be assembled to each of the adapter 6010 and the locator 6020 in a direction angled with respect to the X-axis direction. The upper surface 6011 of the adapter 6010 can receive or contact a lower surface 6025 of the locator 6020. A lower surface 6013 of the adapter 6010 can receive or contact the upper surface 3011 (shown in FIG. 3) of the base 3010.

Figure 8:
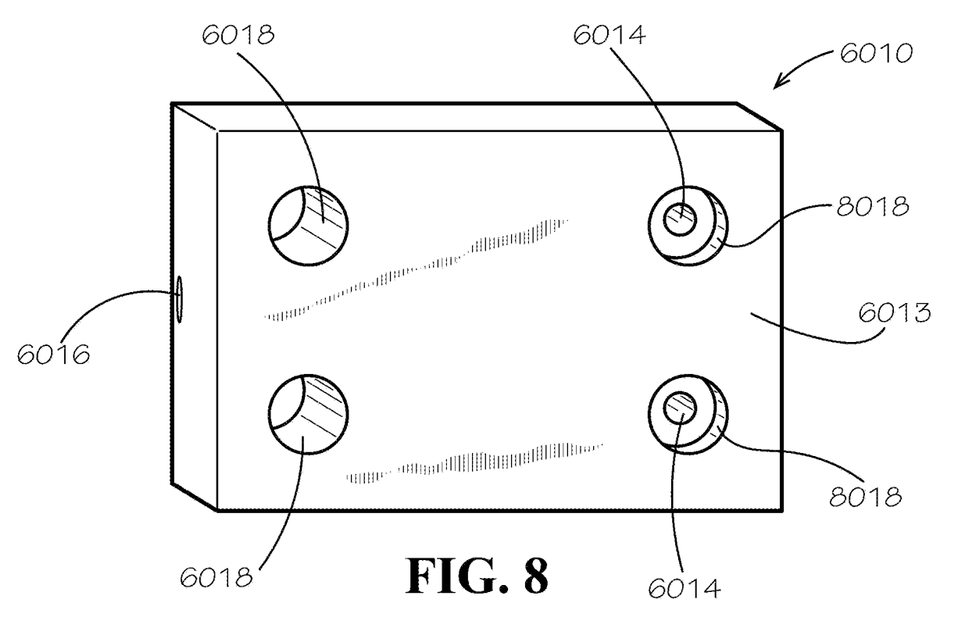
FIG. 8 is a bottom perspective view of an adapter of the support of FIG. 6.

FIG. 8 is a bottom perspective view of the adapter 6010 of the support 3050 of FIG. 6. The adapter 6010 can define one or more position fastener cavities 8018, each of which can be sized, shaped, and otherwise configured to receive the position fastener 6050 (shown in FIG. 6). A cross-section of the position fastener cavity 8018 can be constant in the Z-axis direction (shown in FIG. 6) or in another direction as desired. In some aspects, as shown, the position fastener cavity 8018 can define a substantially circular shape in cross-section. In some aspects, the position fastener cavity 8018 can define a non-circular shape in cross-section. In some aspects, as shown, the position fastener cavity 8018 can define a bottom surface (e.g., the position fastener cavity 8018 can be a blind hole or cavity). In some aspects, as shown, the position fastener cavity 8018 can extend through a full thickness of the adapter 6010.

Figure 9:
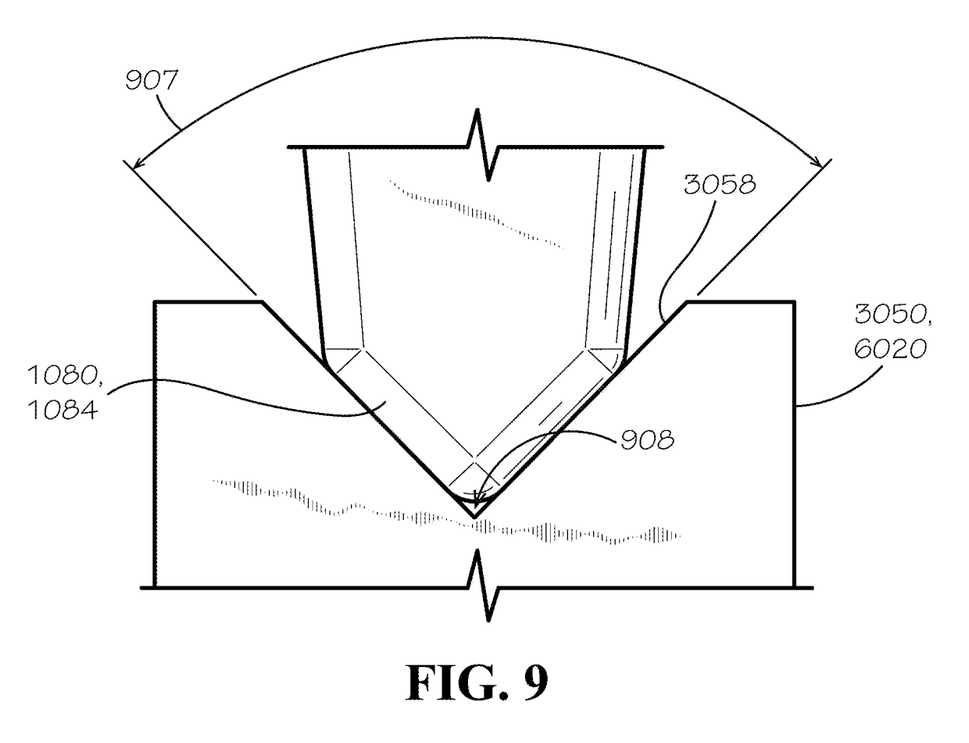
FIG. 9 is a side elevation view of a pin of a plurality of pins of the cast part tree of FIG. 1 received within a recess defined by a support of the plurality of supports of FIG. 3.

FIG. 9 is a side elevation view of a pin 1080 of a plurality of pins 1080 of the part tree 1000 of FIG. 1 received within the recess 3058 defined by the support 3050 of the plurality of supports 3050 of FIG. 3. Again, each of the recesses 3058 can be tapered as shown. More specifically, one or both of the tip 1084 of the pin 1080 and the recess 3058 of the support 3050 can define a taper angle 907 between opposing surfaces of the respective tip 1084 and the recess 3058. To be tapered does not require that opposing surfaces or any surfaces of the pin 1080 be flat, however, but simply that a width narrow along a direction of the pin 1080 (e.g., the Z-axis direction shown in FIG. 3). More specifically, each of the recesses 3058 can define a V-shape in cross-section. In some aspects, a V-shaped pin 1080 and a V-shaped recess 3058 can shed liquid and/or solid contaminants better than a radiused or rounded pin 1080 or recess 3058. As shown, at least one of the pin 1080 and the recess 3058 can define a relief 908. More specifically, in some aspects, a radius or other edge treatment defined in the tip 1084 of the pin 1080 can define the relief 908. In some aspects, a groove or other cavity defined in the recess 3058 can define the relief 908.

The system 50 can comprise a cutting or cut-off machine (not shown), which can be configured to cut the parts 1050 (shown in FIG. 3) from the part tree 1000 (shown in FIG. 3). Such a cut-off machine can be a Model TSF 500, Model TSF 800, or similar cut-off machine available from Reichmann & Sohn GmbH of Weissenhorn, Germany. Such a cut-off machine can comprise one or more cutters, which can be blades. More specifically, in some aspects, the machine can comprise two blades on one hub. The blades, which can rotate within planes parallel to the X-axis direction, can be sufficiently spaced to clear each side of the upper support and thereby cut a pair of gates 1030 (shown in FIG. 4) at once. For example and without limitation, each of the blades can define a diameter of 60 cm (approximately 23.6 inches). In some aspects, the cut-off machine can be configured to plunge cut through one or more of the gates 1030. In some aspects, the blade can comprise an abrasive cutting surface and/or edges. In some aspects, the blade can comprise an chip cutting surface and/or edges.

In some aspects, the cut-off machine can comprise a robotic portion (not shown) comprising arm members connected with articulated joints. The robotic portion can be manipulated by the cut-off machine to make cuts along the cutting reference 1040 that would be more difficult with a blade or blades operating in a non-adjustable (e.g., vertical) plane. Where operation of the cutting tool produces material dust or debris, a vacuum system (not shown) can be used to remove the dust or debris from the area around where the cutting operation is performed to eliminate the effect of such dust or debris on the operation of the system 50.

As disclosed herein, the apparatus 3000 can support each part tree 1000 while individual parts 1050 are removed from the part tree 1000, typically by cutting and thereby separating each part 1050 from the part tree 1000 with a cutoff saw. Typically, at least apart from the structures and methods disclosed herein, the part tree 1000 itself—and not just the geometry of each of the individual parts 1050—has a unique configuration (including, for example, the size, shape, position, orientation, and quantity of the sprue 1010 and runners 1020), and the geometric features for positioning the part tree 1000 on the cutoff fixture are also unique. Some part trees 1000 can each contain 10 to 50 or more individual parts 1050. Responsive to fluctuating customer need (for any one of multiple cast parts 1050) can require that the foundry be set up to fabricate any combination of hundreds of unique part trees 1000. The use of a separate cutoff fixture for each part tree 1000, as is typically done apart from the structures and methods disclosed herein, can be time-consuming because the entire cutoff fixture needs to be swapped out with each change in the production schedule to a new cast part 1050, and idiosyncrasies of each special cutoff fixture can introduce further complexity for foundry workers. Each cast part 1050 also generally requires that a cutoff saw be run with a unique program, and the operator must somehow load and/or select the correct program each time.

As disclosed herein, the part tree support apparatus 3000 can accommodate a large variety of part trees 1000, each of which can comprise parts 1050 having a different design. More specifically, one part tree 1000 can comprise parts 1050 of one design, and another part tree 1000 can comprise parts 1050 of another design, and so on. In some aspects, this result (i.e., the part tree support apparatus 3000 being able to accommodate a large variety of part trees 1000) can be facilitated by making a quantity, a size, and locations of supports 3050 of the part tree support apparatus 3000 common across multiple part trees 1000. A special and unique fixture is no longer required for the part tree 1000 associated with each cast part. Instead, as shown, the pins 1080 can be integrated into the design of similar "families" of part castings, and a complementary geometry can be integrated into the common part tree support apparatus 3000, i.e., each part tree support apparatus 3000 can be designed to receive a common or shared pattern of the pins 1080 of the part trees 1000. In some aspects, a position of any one or more—or, as shown, all—of the supports 3050 of the part tree support apparatus 3000 can be made adjustable. Common gating layouts and common cutoff fixtures can reduce the number of cutoff fixture changeovers. The number of cutoff saw programs can be reduced. This type of modular fixture can also be adapted to accommodate future product offerings that aren't currently produced at the foundry, so long as they conform to one of the standardized runner systems.

As described above, alignment features such as the pins 1080 can be cast into the runner system of each part tree and alignment features such as the recesses 3058 can be defined in the apparatus 3000 in specific, regularly spaced locations for quick reference and use. The most produced part castings (for example, the most produced castings in a foundry, which can satisfy 80% or more of the production volume of the foundry) can be broken into families of castings of similar, dimension, weight, and/or function. A single cutoff-compatible runner system can be cascaded down to accommodate all the castings within a single family. The result can be a limited number of fixturing arrangements (for example and without limitation, only 22 fixturing layouts of the apparatus 3000 for the 180 castings instead of, more typically, 180 unique fixture layouts). In some aspects, the system 50 can be modular in that each of the supports 3050 can be predictably repositioned and/or reconfigured in any of multiple standardized locations to match any family of castings, which can comprise a plurality of part trees 1000. As a more specific example, a single runner and alignment pin arrangement can accommodate 55 or more unique part trees 1000.

A method of using the part tree support apparatus 3000 can comprise preparing the part tree support apparatus 3000 by removably securing each of the plurality of supports 3050 to the base 3010. The method can comprise positioning the part tree 1000 on the apparatus 3000. More specifically, the method can comprise supporting each of a plurality of pins 1080 formed in the part tree 1000 in a corresponding recess 3058 defined in a corresponding support 3050 of the plurality of supports 3050. The method can comprise clamping the part tree 1000 from above with the upper support to immobilize the part tree 1000 during further processing. The method can comprise cutting each of the parts 1050 from the part tree 1000 with a programmable cutting tool while a position of the part tree 1000 with respect to the part tree support apparatus is fixed. More specifically, positioning the part tree 1000 on the apparatus 3000 can comprise fixing a position of the part tree 1000 in three axes with respect to the apparatus 3000 with one of a gravitational force defined by a weight of the part tree 1000 and an upper support of the system 50 comprising the apparatus 3000. The process can be repeated for each part 1050 on the part tree 1000 until all of the parts 1050 are separated from the part tree 1000.

In one aspect, a portion of the gate 1030 can remain on the part 1050 and can be removed by a separate process not described herein. In another aspect, a position of the cutting reference 1040, a geometry of the parts 1050, and/or the accuracy of the cutting operation by the cut-off machine can eliminate the need to further process the part 1050, at least with respect to removal of any remaining portion of the gate 1030.

One or more elements of the apparatus 3000, e.g., the base 3010, the supports 3050, and the upper support, can be formed from any rigid material as desired. For example and without limitation, one or more elements of the apparatus 3000 can be formed from a metallic material such as steel or aluminum, with or without additional finishing to enhance performance in areas such as, for example and without limitation, corrosion-resistance and cleanability.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A part tree support apparatus comprising:
a base defining an upper surface, the upper surface defining a plurality of openings; and
a plurality of supports, each of the plurality of supports extending from the base and removably secured to the base with an attachment fastener engaged with one of the plurality of openings, each of the plurality of supports comprising:
an adapter defining a locator cavity; and
a locator slideably received within the locator cavity and secured to the adapter,
the locator comprising:
a first portion;
a second portion extending from the first portion in a negative Z-axis direction and defining a fastener cavity of the locator and a bottom end of the locator, and
a third portion extending from the first portion in a positive Z-axis direction and defining a notch and a top end of the locator; the first portion defining a position above the second portion and below the third portion, the first portion defining a lower surface contacting an upper surface of the adapter when the locator is received by the adapter, the lower surface of the first portion facing downward and the upper surface of the adapter facing upward;
wherein the locator defines a recess facing in a Z-axis direction, the recess configured to receive a part tree, each of the adapter and the locator defining the fastener cavity, the fastener cavity defining an axis angled with respect to a direction of assembly of the locator with the adapter, the locator removably secured to a corresponding adapter of the plurality of supports with a locator fastener extending through the fastener cavity of each of the adapter and the locator at an angle to the direction of assembly, the angle offset from the direction of assembly, the locator fastener being a quick-release fastener not requiring a separate tool for engagement or disengagement or for tightening or loosening, the quick-release fastener comprising a pin, the pin slidably received within the fastener cavity of each of the adapter and the locator.

2. The apparatus of claim 1, wherein:
the base extends in X-axis and Y-axis directions; and
each of the plurality of supports extends from the base in the Z-axis direction.

3. The apparatus of claim 1, wherein the plurality of openings defines a grid pattern, adjacent openings of the plurality of openings being spaced out apart by a first separation distance in a first direction and a second separation distance in a second direction, each of the first separation distance and the second separation distance being constant between adjacent openings of the plurality of openings.

4. The apparatus of claim 1, wherein the base is a plate.

5. The apparatus of claim 1, wherein the pin of the quick-release fastener is a ball lock pin, a spring-loaded ball received within the pin.

6. The apparatus of claim 1, wherein the attachment fastener of each of the plurality of supports fixes a position of the corresponding support of the plurality of supports with respect to the base.

7. The apparatus of claim 1, wherein the recess of at least one support of the plurality of supports is tapered.

8. The apparatus of claim 7, wherein the recess of at least one support of the plurality of supports defines a V-shape in cross-section.

9. The apparatus of claim 1, wherein an orientation of a recess of at least one support of the plurality of supports is angled with respect to an orientation of a recess of at least one other support of the plurality of supports.

10. The apparatus of claim 1, wherein a surface of the recess is offset from the recess away from a portion of the recess configured to contact the part tree.

11. The apparatus of claim 1, wherein the axis of the fastener cavity of each of the adapter and the locator intersects the locator cavity.

12. The apparatus of claim 1, wherein the angle is 90 degrees.

13. The apparatus of claim 1, wherein the locator cavity defines a substantially rectangular shape in cross-section.

14. The apparatus of claim 1, further comprising a position fastener, the position fastener:
received within one of the plurality of openings defined in the base; and
maintaining an orientation of the adapter with respect to the base in at least one of an X-axis direction and a Y-axis direction.

15. A system comprising:
a part tree support apparatus comprising:
a base defining an upper surface, the upper surface defining a plurality of openings;
a plurality if supports, each of the plurality of supports extending from the base and removably secured to the base with a locator fastener engaged with one of the plurality of supports defining a recess facing in a Z-axis direction; and
a part tree received within the apparatus, the part tree comprising a runner, a plurality of parts extending from the runner, and a plurality of pins, each of the plurality of pins formed monolithically with the part tree and configured to be received within a corresponding recess of the support apparatus, each of the plurality of pins comprising a base and a tip and extending from the base to the tip in a direction angled with respect to the runner, the tip of each of the plurality of pins being received within the recess of a corresponding support of the plurality of supports, a position of the part tree fixed with respect to the apparatus.

16. The apparatus of claim 15, wherein:
the base extends in X-axis and Y-axis directions;
each of the plurality of supports extends from the base in the Z-axis direction; and
the plurality of openings defines a grip pattern, adjacent openings of the plurality of openings being spaced apart by a first separation distance in a first direction and a second separation distance in a second direction, each of the first separation distance and the second separation distance being constant between adjacent openings of the plurality of openings.

17. The system of claim 15, wherein an orientation of the recess of at least one support of the plurality of supports is angled with respect to an orientation of the recess of at least one other support of the plurality of supports, a position of the part tree fixed in three axes with respect to the apparatus when the part tree is held in place in the apparatus.

18. The system of claim 17, wherein an orientation of a pin of the plurality of pins is angled with respect to an orientation of at least one other pin of the plurality of pins, the pin whose orientation is so angled being received within the recess whose orientation is so angled.

19. The system of claim 15, wherein runners of the part tree extend in one of an X-axis direction and a Y-axis direction.

20. The system of claim 15, wherein the part tree is a cast part tree.

21. A method of using a part tree support apparatus, the method comprising:
preparing the part tree support apparatus by removably securing each of a plurality of supports to a base, the apparatus comprising each of the plurality of supports and the base; and
positioning a part tree on the apparatus, the part tree comprising a runner, a plurality of parts extending from the runner, and a plurality of pins; each of the plurality of pins being supported in a corresponding recess defined in a support of the plurality of supports, each of the plurality of pins comprising a base and a tip and extending from the base to the tip in a direction angled with respect to the runner, the tip of each of the plurality of pins being received within the corresponding recess.

22. The method of claim 21, further comprising cutting each of the parts from the part tree with a programmable cutting tool while a position of the part tree with respect to the part tree support apparatus is fixed.

23. The method of claim 21, wherein positioning a part tree on the apparatus comprises fixing a position of the part tree in three axes with respect to the apparatus.

24. The method of claim 21, wherein the part tree is a cast part tree.

* * * * *